Figure 1:
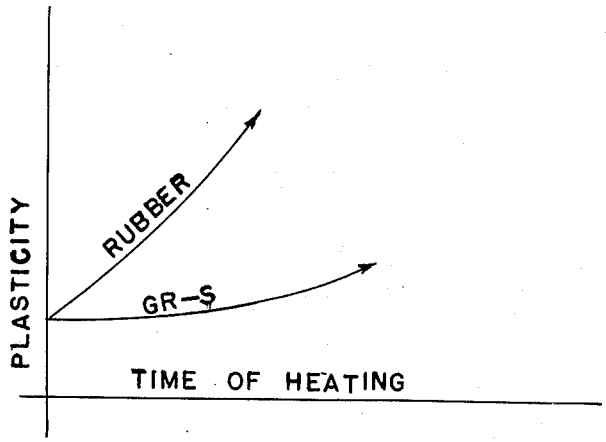

Sept. 12, 1950     F. W. STATEN ET AL     2,522,069
PROCESS FOR RECLAIMING MIXED VULCANIZATES OF
NATURAL AND SYNTHETIC POLYMERS
Filed Oct. 23, 1948

INVENTORS,
FRED W. STATEN and
BY WILLIAM M. HAINES JR.

ATTORNEY

Patented Sept. 12, 1950

2,522,069

UNITED STATES PATENT OFFICE 2,522,069

PROCESS FOR RECLAIMING MIXED VULCANIZATES OF NATURAL AND SYNTHETIC POLYMERS

Fred W. Staten and William M. Haines, Jr., Denver, Colo., assignors to The Gates Rubber Company, Denver, Colo., a corporation of Colorado Application October 23, 1948, Serial No. 56,122

5 Claims. (Cl. 260—2.3)

This invention relates to a process for reclaiming and softening vulcanizates of synthetic rubber and has reference more particularly to an improved process for reclaiming mixed vulcanizates of natural and synthetic polymers of the type generally referred to as GR–S, which is a copolymer of butadiene and styrene in various proportions, butadiene being generally present in the range of 40 to 90 per cent.

Vulcanized natural rubber scrap can be easily reclaimed by the commonly used digester method in which the scrap is shredded, sealed in an autoclave with water, and heated to a temperature above that required for vulcanization until the rubber becomes plastic. The process is completed by drying the scrap and milling it on a friction refiner which blends the stock, and plasticizers it further. Those portions of the rubber particles not properly plasticized are removed as tailings. To make the process more uniform as well as more economical, plasticizing or penetrating oils and solvents are usually added; by adding such oils either the time or the temperature of heating may be reduced, the milling improved and the percentage of tailings reduced. The oils mentioned are of petroleum, coal tar or wood distillation origin. If textile fibers are present in the scrap, such as rayon or cotton, which are usually present when the scrap is from tires, chemicals, such as caustic soda or zinc chloride are added to dissolve such fibers.

It is well known in the art that catalytic agents may be used in addition to the above materials to assist in the reclaiming process. By the use of these chemical softening agents, or peptizers, the reclaiming process may be carried out at a lower temperature, in a shorter time, or with less added oil and which results in a reduction of tailings. These peptizers are of many different types, including mono aryl hydrazines, dihydro aryl sulfides, thio phenols, mercaptans, secondary amines, etc.

In the ordinary digester process oxygen is always present, both from free air in the kettle and from dissolved oxygen in the water. Although the exact action of oxygen on the process is not known, it is believed to be necessary for economical and effective plasticization. If oxygen is added to the system in the form of superimposed air pressure or as oxidizing chemicals the softening process is accelerated.

An example of a modern reclaiming process would be as follows:

Example 1

| | Parts by weight |
|---|---|
| Ground rubber tires | 100 |
| Water | 150 |
| Zinc chloride | 2 |
| Solvent naphtha | 4 |
| Blown asphalt | 4 |
| Dicresylsulfide | 0.25 |

The above is sealed in a digester with free air space, agitated and heated for ten hours at a temperature of 375 degrees Fahrenheit by means of a steam jacket. The contents of the digester are discharged, washed, dried, and passed twice through a refiner which produces a smooth clean material suitable for the manufacture of rubber goods. A minor proportion of tailings results.

If a synthetic rubber, such as GR–S is reclaimed by the above formulation, it will not be very plastic, will be difficult to refine and the recovery will be low because of a high percentage of tailings.

Figure 1 is a diagram showing the relative plasticity of natural rubber and GR–S when both are subjected to treatment with the method outlined above for use with natural rubber.

It has been found, however, that synthetic rubber can be successfully reclaimed by increasing the softening oils and peptizers three to four fold whereby the synthetic rubber becomes quite plastic, refines easily and gives a low amount of tailings.

A typical formulation for reclaiming synthetic rubber is as follows:

Example 2

| | Parts by weight |
|---|---|
| Ground synthetic tires | 100 |
| Water | 150 |
| Zinc chloride | 2 |
| Blown asphalt | 16 |
| Solvent naphtha | 16 |
| Dicresylsulfide | 1 |

Figure 2:
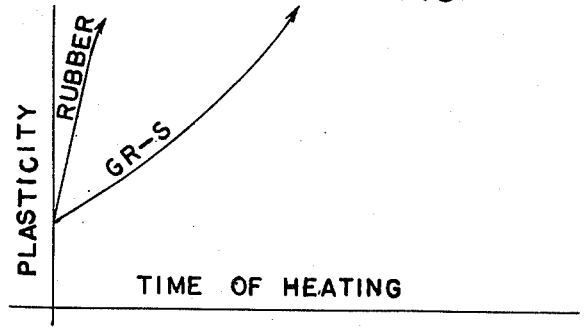

Figure 2 is a diagram showing the relative plasticity of natural rubber and GR–S when both are subjected to treatment with the formulation given directly above. From Figure 2 it is seen that, although the GR-S can be sufficiently plasticized by this method, the natural rubber becomes too soft to make the method of practical value for natural rubber.

It is seen from the above that both natural rubber and synthetic rubber can be economically reclaimed by themselves to provide a product useful in the manufacture of rubber goods. However, the reclaimer is faced with the problem of reclaiming mixtures of these two together. Scrap coming from salvage dealers often contains articles made from natural rubber and synthetic rubber indiscriminately piled together. Separating these by hand sorting is a costly operation. Then too, many rubber articles are manufactured containing layers of synthetic and natural rubber bonded together. To separate these layers is very difficult. Furthermore, rubber products are often made by blending together during manufacture, natural and synthetic rubber. Separation of these blended rubbers, at present, is virtually impossible. It is easily seen, then, that it would be very desirable to have a single process whereby both synthetic and natural rubber could be reclaimed simultaneously.

If a mixture of a synthetic and natural rubber is treated as shown above in Example 1 for reclaiming rubber, the rubber portion will be satisfactory, but the synthetic rubber portion will not be plasticized. The synthetic rubber portion will hinder refining, will decrease the recovery of the process, and hence increase its cost by coming out as tailings during passage through the refiner. On the other hand, if the mixture is treated as in Example 2, the synthetic rubber portion will be satisfactory but the natural rubber portion will be excessively plasticized, excessively sticky, interfere with refining and be degraded for ordinary use.

We have found that when certain substances are added to the formulations already mentioned, that rubber and GR-S can be simultaneously reclaimed in an economical and practical process with no increase in refining costs and no increase in the amount of tailings to yield a product suitable for use in rubber goods. The above object may be accomplished by the use of soluble iron salts in which the iron is capable of changing valence from three to two reversibly. The reaction is promoted when both reducing and oxidizing agents are present in the system to facilitate this back and forth valence change.

The invention that forms the subject of this application and whose object is to produce a formulation and a method of treatment that will plasticize the natural rubber and GR-S at so nearly the same rate that the reclaim will be suitable for refining will now be described.

A formulation by means of which mixtures of natural and GR-S synthetic rubber may be satisfactorily reclaimed is as follows:

*Example 3*

| | Parts by weight |
|---|---|
| Ground rubber treads | 50 |
| Ground GR-S treads | 50 |
| Water | 150 |
| Potassium bichromate | 1.5 |
| Solvent naphtha | 5 |
| Blown asphalt | 7 |
| Ferric chloride | 0.5 |
| Dicresylsulfide | 0.25 |

In the above example the iron salt or oxidizing catalyst may be any water soluble iron salt capable of reversible oxidation and reduction; such as ferric sulfate, ferric nitrate, ferrous citrate, etc. The oxidizing agent may be sodium bichromate, hydrogen peroxide, potassium perborate or oxygen or air under pressure, or a combination thereof. The reducing agents may be of the class of mercaptans, aryl sulfides, etc.

Although this process successfully and simultaneously reclaims mixtures of natural rubber and synthetic rubber, the changes which take place in the structure are not understood. It is our belief that oxygen promotes the reaction. Oxygen can act on high polymers, in two ways: either by breaking down the chain molecules and reducing their molecular weight which causes the rubber or synthetic rubber to become more plastic; or by cross-linking the chains to make them more rigid, brittle, and hard. It is our belief that both reactions go on concurrently. In the case of rubber, the chain breakdown proceeds at a much faster rate than cross-linking. In the case of synthetic rubber, the cross-linking proceeds at the faster rate. The action of the oxidizing catalyst appears to speed up the chain breakdown rate of the GR-S to make it substantially equal to that of rubber, and hence the two will respond to the same treatment in a like manner.

It is important that sufficient oxygen be present to insure satisfactory oxidation, and as pointed out above this may be supplied in the form of an oxygen releasing compound, air, or pure oxygen. When the oxygen is provided in the form of air or pure oxygen gas, the quantity must be sufficient to effect the purpose. If the free volume in the autoclave is small, the pressure of the gas must be increased to such an extent that the free space will contain the quantity of oxygen necessary to carry out the reaction. The free space in the autoclave is usually so proportioned to the quantity of material therein that if it is filled with pure oxygen at a pressure of twenty pounds per square inch, satisfactory oxidation will result. If the same space is filled with air, the pressure must be increased to one hundred pounds per square inch. Where the free space is very large in proportion to the quantity of material to be reclaimed, a pressure below atmospheric will suffice. Pressure is important and must be selected with due regard to the relationship of the free space and the quantity of material under treatment.

Figure 3:
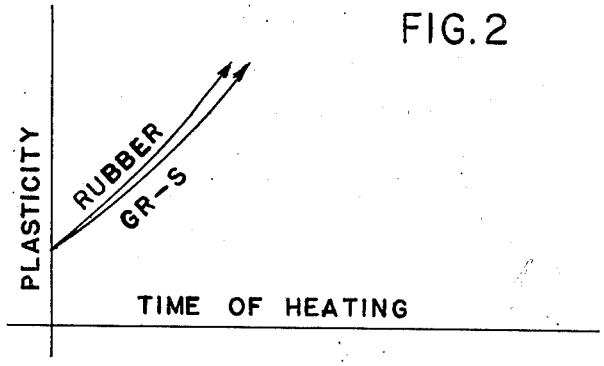

Figure 3 of the drawing shows graphically the relationship between the plasticity of the natural rubber and the GR-S when subjected to treatment in accordance with the last mentioned formulation. The two types of rubber plasticize at so nearly the same rate that the resultant reclaim can be worked and utilized in the ordinary way.

Where GR-S alone is to be reclaimed, the following formulation has been found to give highly satisfactory results.

*Example 4*

| | Parts by weight |
|---|---|
| Ground GR-S treads | 100 |
| Water | 150 |
| Potassium bichromate | 1.5 |
| Solvent naphtha | 5.0 |
| Blown asphalt | 7.0 |
| Ferric chloride | 0.5 |
| Dicresylsulfide | 0.35 |

In the above examples, the temperature of the mixture was maintained in the range usually employed for rubber scrap reclaim which may be successfully carried on in the temperature range between 350 and 420 degrees Fahrenheit. The time required for plasticizing varies with different vulcanites. It has been found that for the usual scrap rubber whether natural or synthetic, the time is within the range of between four and ten hours.

Having described the invention, what is claimed as new is:

1. The process of reclaiming a scrap mixture of vulcanizates of natural rubber and rubbery butadiene styrene copolymers, which comprises, heating and maintaining the mixture at a reclaiming temperature, in the presence of an oxidizing agent, while in an aqueous solution comprising a reclaiming oil, a peptizing agent and an added aqueous soluble reversible multivalent catalyst in a quantity to effect substantially the same degree of plasticization of said vulcanizates, said catalyst being selected from the group consisting of ferrous and ferric salts.

2. A process in accordance with claim 1 wherein said catalyst is ferric chloride.

3. A process in accordance with claim 1 wherein said catalyst is ferric sulphate.

4. A process in accordance with claim 1 wherein said catalyst is ferric nitrate.

5. A process in accordance with claim 1 wherein said catalyst is ferrous citrate.

FRED W. STATEN.
WILLIAM M. HAINES, Jr.

REFERENCES CITED

The following references are of record in the file of this patent:

UNITED STATES PATENTS

| Number | Name | Date |
| --- | --- | --- |
| 2,338,427 | Gumlich et al. | Jan. 4, 1944 |
| 2,359,122 | Kirby et al. | Sept. 26, 1944 |
| 2,469,529 | Tewksbury et al. | May 10, 1949 |

FOREIGN PATENTS

| Number | Country | Date |
| --- | --- | --- |
| 578,482 | Great Britain | July 1, 1946 |

OTHER REFERENCES

Handbook of Chemistry, Lange, 5th edition, pp. 744–747, pub. 1944 by Handbook Publishers, Inc., Sandusky, Ohio.